United States Patent
Ajami et al.

(10) Patent No.: US 12,446,086 B2
(45) Date of Patent: Oct. 14, 2025

(54) COORDINATING MULTI-LINK OPERATION WITH COMMUNICATION LINKS

(71) Applicant: QUALCOMM Incorporated, San Diego, CA (US)

(72) Inventors: Abdel Karim Ajami, Lakeside, CA (US); Abhishek Pramod Patil, San Diego, CA (US); Alfred Asterjadhi, San Diego, CA (US); Sai Yiu Duncan Ho, San Diego, CA (US); George Cherian, San Diego, CA (US); Gaurang Naik, San Diego, CA (US); Yanjun Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 421 days.

(21) Appl. No.: 17/883,563

(22) Filed: Aug. 8, 2022

(65) Prior Publication Data

US 2024/0049316 A1 Feb. 8, 2024

(51) Int. Cl.
*H04W 52/02* (2009.01)
*H04W 76/10* (2018.01)
*H04W 76/12* (2018.01)
*H04W 76/15* (2018.01)

(52) U.S. Cl.
CPC ....... *H04W 76/15* (2018.02); *H04W 52/0216* (2013.01); *H04W 76/12* (2018.02)

(58) Field of Classification Search
CPC .. H04W 76/15; H04W 52/0216; H04W 76/12
See application file for complete search history.

(56) References Cited

U.S. PATENT DOCUMENTS

| | | |
|---|---|---|
| 2013/0195036 A1 | 8/2013 | Quan et al. |
| 2016/0219522 A1* | 7/2016 | Asterjadhi ........ H04W 52/0235 |
| 2020/0267644 A1* | 8/2020 | Rajib ................ H04W 52/0216 |
| 2022/0022033 A1 | 1/2022 | Ho et al. |
| 2022/0039183 A1* | 2/2022 | Chu ....................... H04W 76/12 |
| 2022/0303893 A1* | 9/2022 | Chu ....................... H04W 76/40 |
| 2022/0330366 A1* | 10/2022 | Chu .................... H04W 28/082 |
| 2022/0408367 A1* | 12/2022 | Shafin ................... H04W 76/14 |
| 2022/0408508 A1* | 12/2022 | Chu ....................... H04L 1/1621 |
| 2023/0047705 A1* | 2/2023 | Xin .................. H04W 74/0808 |
| 2024/0015564 A1 | 1/2024 | Park et al. |

OTHER PUBLICATIONS

3GPP TSG-RAN WG1 Meeting#98bis, R1-1911673 Title:LS on Layer 2 identifiers for NR sidelink communication (Year: 2019).*
3GPP TSG RAN WG1 Meeting#96bis, R1-1905275 Title:Spectrum Utilization in 20MHz channel bandwidth fro 60KHz SCS (Year: 2019).*

* cited by examiner

*Primary Examiner* — Faruk Hamza
*Assistant Examiner* — Abusayeed M Haque
(74) *Attorney, Agent, or Firm* — Patterson + Sheridan, L.L.P./Qualcomm

(57) ABSTRACT

Certain aspects of the present disclosure provide a method for wireless communication at a first station. The method generally includes establishing at least one communication link with a second station and transmitting, to a first MLD, an indication of the communication link and a time period in which the first station will operate on the communication link.

28 Claims, 11 Drawing Sheets

| Category | WNM Action | Dialog Token | Channel Usage Elements | Supported Operating Classes Element | TWT Elements (optional) | Link ID or Link ID Bitmap |
|---|---|---|---|---|---|---|
| 1 | 1 | 1 | variable | variable | variable | |

Octets:

*FIG. 6*

COORDINATING MULTI-LINK OPERATION WITH COMMUNICATION LINKS

BACKGROUND

Field of the Disclosure

Aspects of the present disclosure relate to wireless communications, and more particularly, to techniques for handling multi-link operation (MLO) with communication links.

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a method for wireless communication at a first station. The method includes establishing at least one communication link with a second station; and transmitting, to a first MLD, an indication of the communication link and a time period in which the first station will operate on the communication link.

Another aspect provides a method for wireless communication at a first MLD. The method includes receiving, from a first station, an indication of: at least one communication link that the first station established with a second station, and a time period in which the first station will operate on the communication link; and transmitting information, based on the indication, to assist the first station in selecting an off-channel for communications.

Other aspects provide: an apparatus operable, configured, or otherwise adapted to perform any one or more of the aforementioned methods and/or those described elsewhere herein; a non-transitory, computer-readable media comprising instructions (e.g., processor-executable instructions) that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 depicts an example field used to indicate unavailable links, in accordance with aspects of the present disclosure.

DETAILED DESCRIPTION

Figure 1:
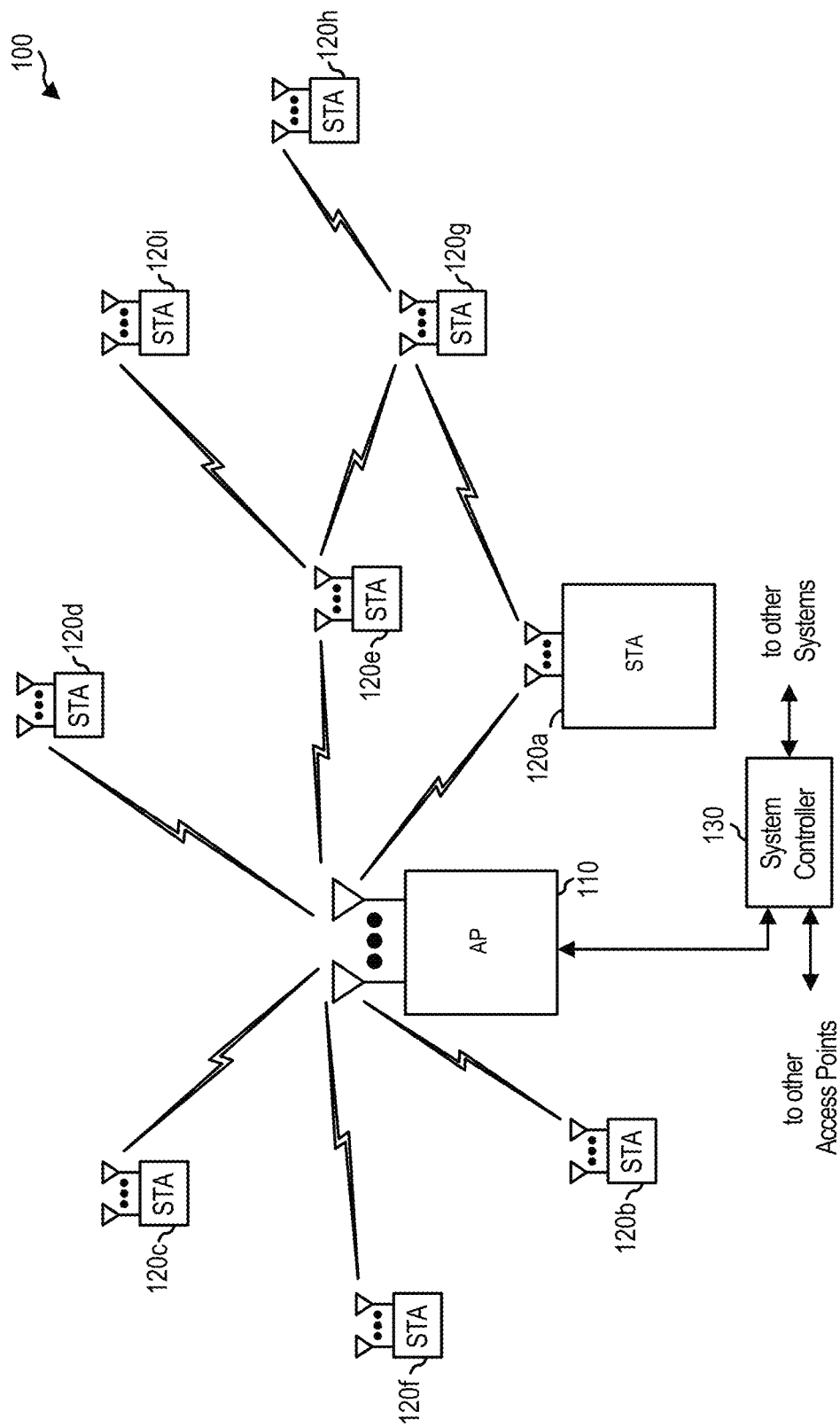
FIG. 1 depicts an example wireless communications network.

Aspects of the present disclosure provide apparatuses, methods, processing systems, and computer-readable mediums for synchronization of target wake up times.

Multi-link operation (MHLO) generally refers to a feature in advanced wireless systems (e.g., 802.11be Extremely High Throughput (EHT)) that enables the utilization of multiple links using individual frequency channels to transmit and receive between devices. MLO may enable concurrent utilization of multiple radio links of different frequency channels/bands by an AP, a client, or both.

MLO enables a pair of devices to use multiple wireless links in different bands simultaneously for transmission and reception. MLO allows simultaneous use of multiple bands at a lower hardware cost than that of a single multiband radio and also enhances the throughput of a single data session, while current multiband APs may allow client devices to connect using only one band at a time. Ideally, the maximum achievable throughput of MLO is the sum of the achievable throughput for each link.

In some systems, a direct link between client devices, referred to as a peer-to-peer (P2P) or direct link, may be established between stations, while one or more of the stations may also remain associated with an AP. These P2P mechanisms may help reduce the amount of traffic that is transferred in the network and prevent congestion at the AP.

A P2P link may be set up automatically between the devices, without intervention from the AP or the user, and the connection with the AP may be maintained.

One potential challenge when using P2P links in conjunction with MLO is that when a plurality of link pairs are formed between an AP multi-link device (MLD) and two non-AP MLDs, one or more link pairs may become ineffective. For example, one or more links may form a non-simultaneous transmission and reception (NSTR) link pair with another link, reducing the effectiveness of such links. Conventional solutions to avoid forming an NSTR pair, including signaling a doze state (e.g., setting a power management bit to 1), may not be sufficient, because P2P traffic may be periodic. In a conventional system, stations of the non-AP MLDs do not inform and are not required to inform the AP MLD of busy channels that form NSTR link pairs.

Aspects of the present disclosure, however, may help prevent such scenarios, by allowing a station to indicate the existence of P2P links to an AP, as well as a time period in which the station may operate on the link. As a result, the AP may help the station establish a link that does not form an NSTR link pair (e.g., directing the station to another channel). With the (AP aided off-channel Target Wake Time (TWT)) scheme proposed herein, an AP MLD may be made aware of a P2P link and the times when a non-AP MLD will be using the P2P link. Thus, the AP MLD may know the times to avoid communicating with the non-AP MLD on the links that form an NSTR pair with the P2P link.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.
Example Wireless Communications System FIG. 1 is a diagram illustrating an example wireless communication system 100, in accordance with certain aspects of the present disclosure. System 100 may be a multiple-input multiple-output (MIMO)/multi-link operation (MHLO) system 100. As shown in FIG. 1, an access point (AP) 110 includes an association manager 112 that may be configured to take one or more actions described herein. The wireless station (STA) 120a includes an association manager 122 that may be configured to take one or more actions described herein. In aspects, AP 110 and wireless station 120a may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). As used herein, a communication link may refer to a peer-to-peer (P2P) link between two non-AP STAs (e.g., non-AP MLDs) or a link between two APs (e.g., AP MLDs). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
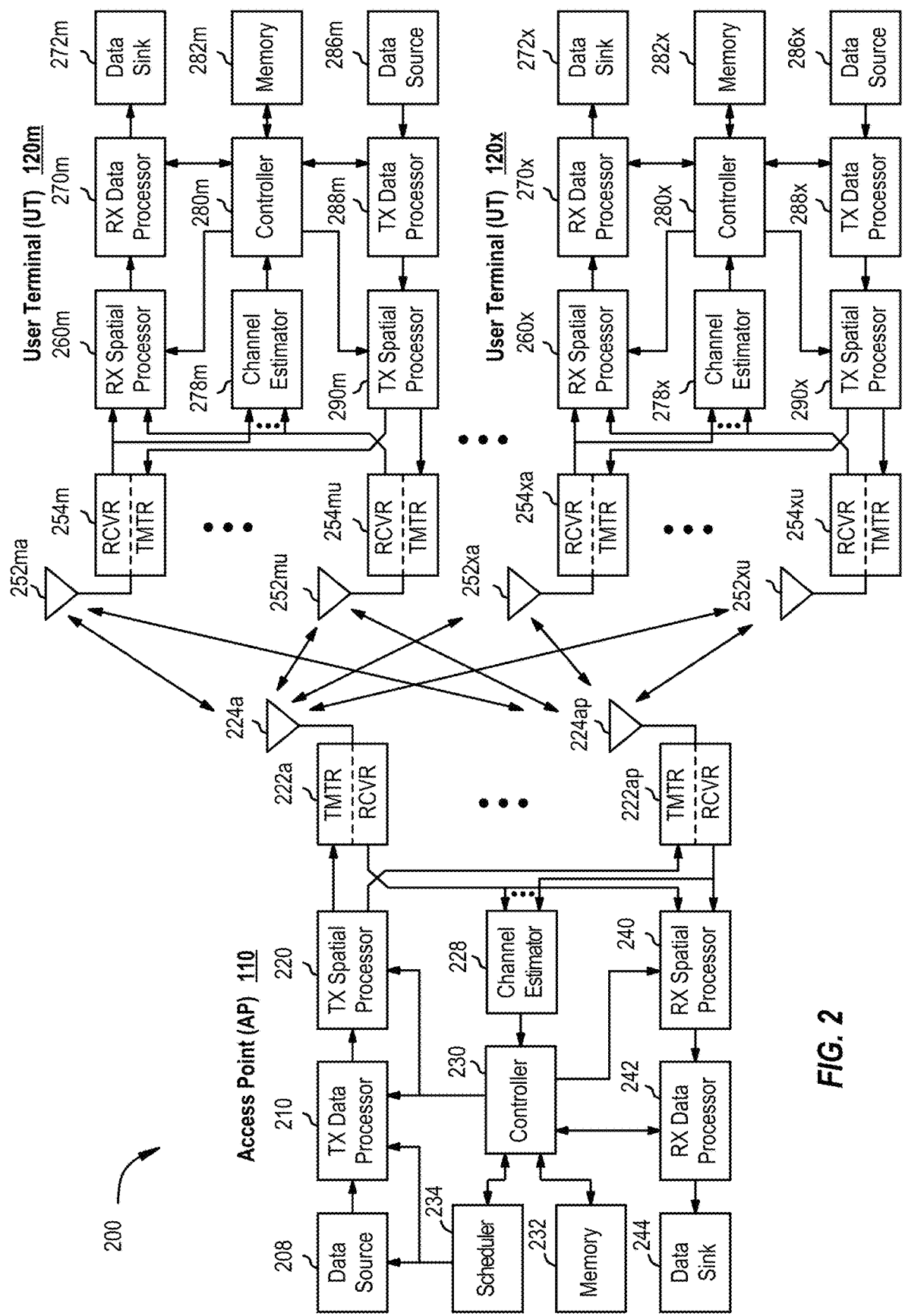
FIG. 2 depicts an example disaggregated base station architecture.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective association manager as described herein with respect to FIG. 1.

AP 110 is equipped with $N_{ap}$ antennas 224a through 224t. Wireless STA 120m is equipped with $N_{sta,m}$ antennas 252ma through 252mu, and wireless STA 120x is equipped with $N_{sta,x}$ antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on that STA's data symbol stream and transmits that STA's set of transmit symbol streams on the UL to the AP 110.

At AP 110, $N_{ap}$ antennas 224a through 224ap receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Multi-Link Devices

As initially described above, a multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 3:
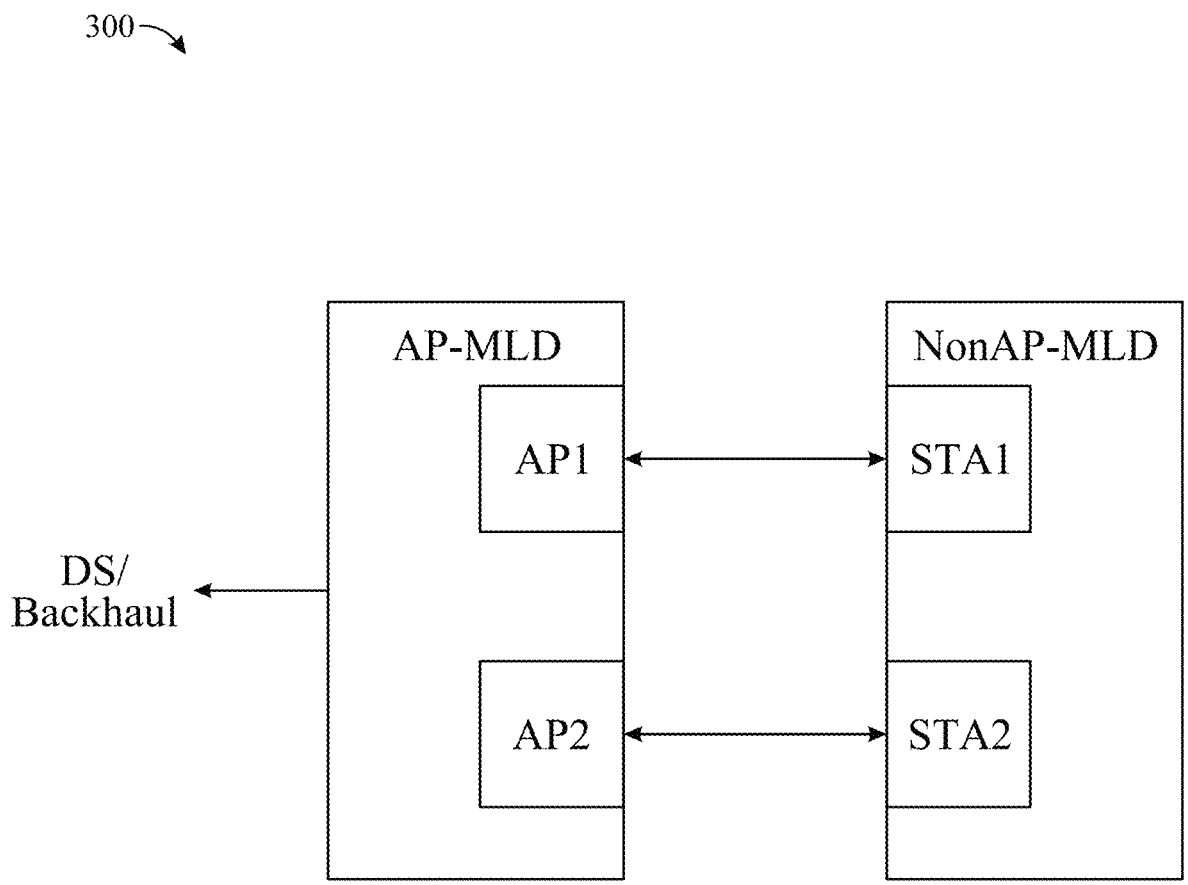
FIG. 3 depicts a block diagram of an example multi-link device (MLD) deployment.

FIG. 3 shows a block diagram of an example MLD deployment. As shown in FIG. 3, an access point (AP) MLD may communicate with a non-AP MLD. Each of the AP MLD and non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also count down on both wireless links (e.g., assuming Link 1 and Link 2). If a first link (e.g., Link 1) wins the medium, both links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to that STA's tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that wins the medium. The other wireless link may be blocked by in-device interference greater than −62 decibels per milliwatt (dBm). No aggregation gains may be realized in this mode.

Aspects Related to Handling P2P with MLO

Some systems (e.g., 802.11be) have defined multi-link Tunneled Direct Link Setup (TDLS) operation. One potential issue with the TDLS procedure, however, is that a TDLS station (STA) affiliated with a non-access point (AP) multi-link device (MLD) can negotiate a TDLS (P2P) link with either a legacy TDLS STA or a TDLS STA affiliated with another non-AP MLD.

A STA may establish a TDLS direct link on either the same channel or a different channel than the operating channels of the STA's associated AP links. As a result, in either case, the TDLS link that is setup by the non-AP STA may form an NSTR link pair with one of the (infra-band) links established with the associated AP.

Unfortunately, the TDLS direct link is transparent to the associated AP of an AP MLD (meaning the AP is unaware of the link) and, hence, the AP may unintentionally violate certain non-simultaneous transmit receive (NSTR) rules. Also, a STA that is busy on a TDLS link may not be able to receive while sending TDLS transmissions. This potential problem with TDLS operation with MLO may apply to any P2P link, regardless of the protocol used for establishment of the link (e.g., whether TDLS, neighbor aware network (NAN), or a Wi-Fi Direct.

Figure 4A:
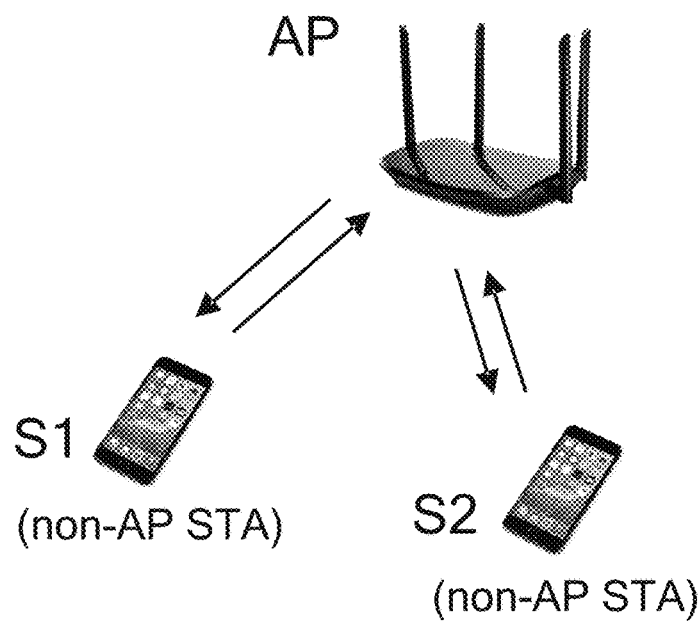
FIG. 4a depicts example communications between an access point (AP) and wireless stations (STAs).

This potential problem may be illustrated with reference to the example scenario shown in FIG. 4a, in which an AP communicates with stations (STAs) S1 and S2. The example assumes that the AP, S1 and S2 may support MLO (e.g., the AP, S1, and S2 may be 802.11 be devices).

Figure 4B:
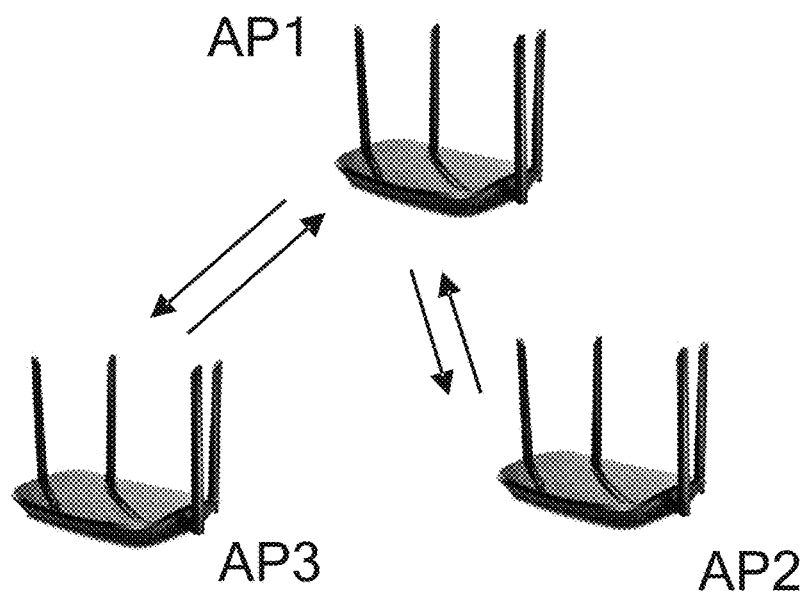
FIG. 4b depicts example communications between APs.

In some cases, as in the scenario shown in FIG. 4b, an AP (e.g., AP 1) may communicate (e.g., form a communication link) with APs AP2 and AP3, to coordinate their transmissions to improve system efficiency and/or reliability. According to certain aspects, the AP may request assistance to select a channel and/or TWT service period (SP). This may be especially useful if one of the APs is a mobile AP or mobile AP MLD to establish its BSS on a clean channel. The example assumes that AP1, AP2 and AP3 may support MLO (e.g., AP1, AP2, and AP3 may be 802.11 be devices).

Figure 5:
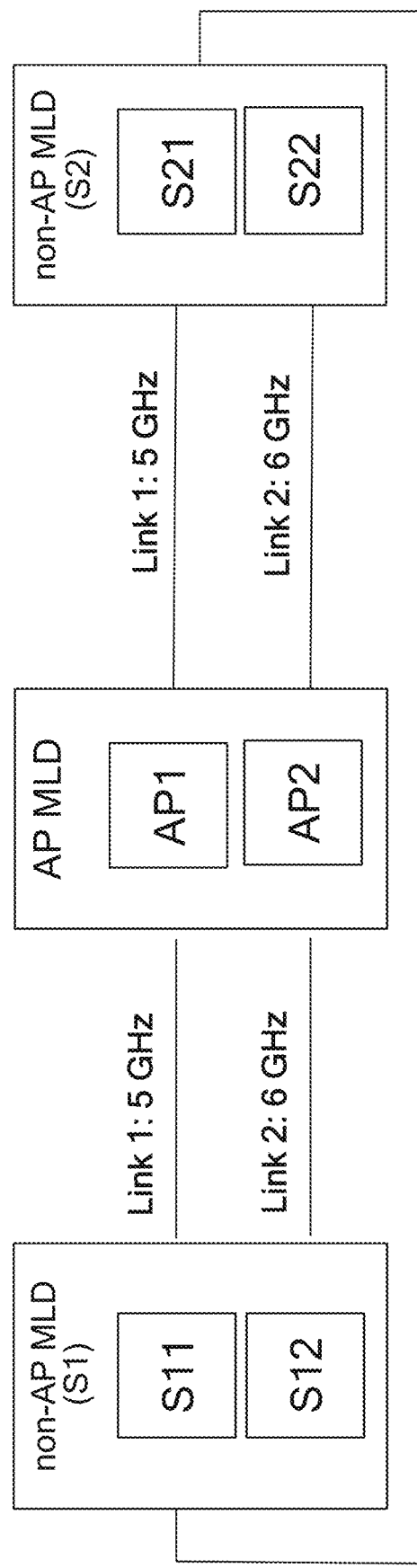
FIG. 5 depicts example link pairs between an AP MLD and stations affiliated with non-AP MLDs.

As shown in FIG. 5, S1 and S2 may establish MILD links with the AP, for example using a first link (e.g., 5 GHz Link 1) and a second link (e.g., a 6 GHz Link 2). As illustrated, S1 and S2 may act as non-AP MLDs, while the AP acts as an AP MLD.

In addition, S1 and S2 may establish a direct link between each other. In the illustrated example, S1 and S2 for a TDLS direct link via the 5 GHz channel. As noted above, this (TDLS 5 GHz) Direct Link may form an NSTR link pair with Link 1 and Link 2 at non-AP MLD S1 and S2. Hence, either the MLD links or the TDLS link may become ineffective. One potential mechanism of signaling a low power (e.g., a doze) state to indicate unavailability of a link (e.g., by setting a power management (PM) bit to 1) may not be sufficient to avoid this problem, as P2P traffic may be periodic and, hence, the STAs may fail to inform the AP in a timely manner in case of busy channel.

Aspects of the present disclosure, however, may help prevent NSTR link pair formation scenarios, by allowing a station to indicate the existence of P2P links to an AP, as well as a time period in which the station may operate on the link. As a result, the AP may help the station establish a link that does not form an NSTR link pair (e.g., directing the station to another channel).

In some cases, a first station, such as S1 in FIG. 5, may establish at least one communication link with a second station (e.g., S2 or some other station that may or may not be affiliated with an MLD). The first station may transmit, to a first MLD, an indication of the communication link and a time period in which the first station will operate on the communication link. For example, in the example shown in FIG. 5, S1 may transmit to AP MLD an indication of the P2P link S1 established with S2. In some aspects, the first station may be affiliated with a second MLD. The second MLD may be an AP-MLD or a non-AP MLD.

The signaling techniques described herein may be applied in a variety of use cases. For example, in a multi-AP coordination use case, a neighboring AP (which may or may not be affiliated with an MLD) requesting this (target) AP to set up an off-channel link (with or without TWT) for communication. Thus, the techniques may be used for multi-AP coordination or some other purpose.

In some cases, the techniques may be implemented as a rule (or set of rules) that define functionality at non-AP MLD, AP-MLD, and P2P stations. Such rules may have different levels of functionality and optimization.

For example, at a first level (Level 1), a non-AP STA affiliated with a non-AP MILD may transmit, to an associated AP of the AP MLD, an indication of the channel of a P2P link and about the time schedule in which the STA will operate on the p2p link. A non-AP STA may enable/disable an NSTR mode accordingly.

At a second level (e.g., Level 2 Optimization), a TDLS/ P2P non-AP STA may request assistance from the associated AP to select a channel for the off-channel P2P, so that the non-AP STA can avoid forming an NSTR link pair with an MLD (infrastructure or infra) channel.

In some cases, a rule may be added to a standard specification to support these different levels of operation. For example, for Level 1, a rule may dictate that (e.g., an AP may be configured such that) an AP affiliated with an AP MLD is not to transmit any frame to corresponding non-AP STAs affiliated with the non-AP MLD, during the time that overlaps with the indicated P2P link transmissions. For Level 2, a rule may dictate that (e.g., an AP may be configured such that) an AP is to assist the non-AP MLD by providing information indicating P2P off channels that do not form NSTR link pairs with the infra links. As used herein, the term off-channel generally refers to any channel that is outside of a set of (one or more) channels currently used for communication.

There are various options for signaling indications of P2P links and corresponding time periods in which a station will operate thereon.

Figure 7:
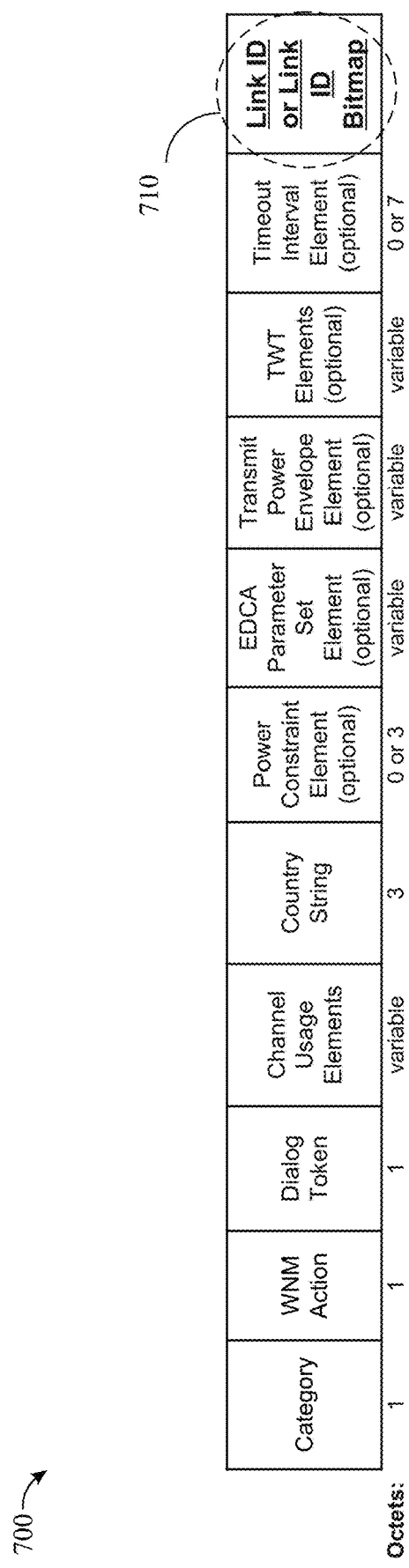
FIG. 7 depicts an example field used to indicate unavailable links, in accordance with aspects of the present disclosure.

For example, according to a first option, an off-channel Target Wake Time (TWT) request/response frame may be extended to indicate infra setup links (e.g., through a Link ID bitmap field) that are not available during the time that overlaps with the off-channel TWT. In some examples, a channel usage request frame action field 600 shown in FIG. 6 (and/or the channel usage respond frame action field 700 shown in FIG. 7) may include a Link ID bitmap field 610 to indicate links that are not available during the time that overlaps with the off-channel TWT.

Using such mechanisms, a non-AP may indicate explicitly through the Link ID or Link ID bitmap field to the AP which infra links will be unavailable during the off-channel TWT. Alternatively, or in addition, the AP can decide which links are unavailable for a particular non-AP STA, for example, based on the AP's knowledge from the Basic ML element transmitted by the non-AP STA affiliated with the non-AP MLD (e.g., Frequency Separation for an simultaneous transmission and reception (STR) subfield).

In some cases, additional fields may be included, such as an enhanced multi-link single-radio (EMLSR), enhanced multi-link multi-radio (EMLMR), or NSTR Mode fields and Link Bitmap fields as in EML Control field (11be).

Figure 8:
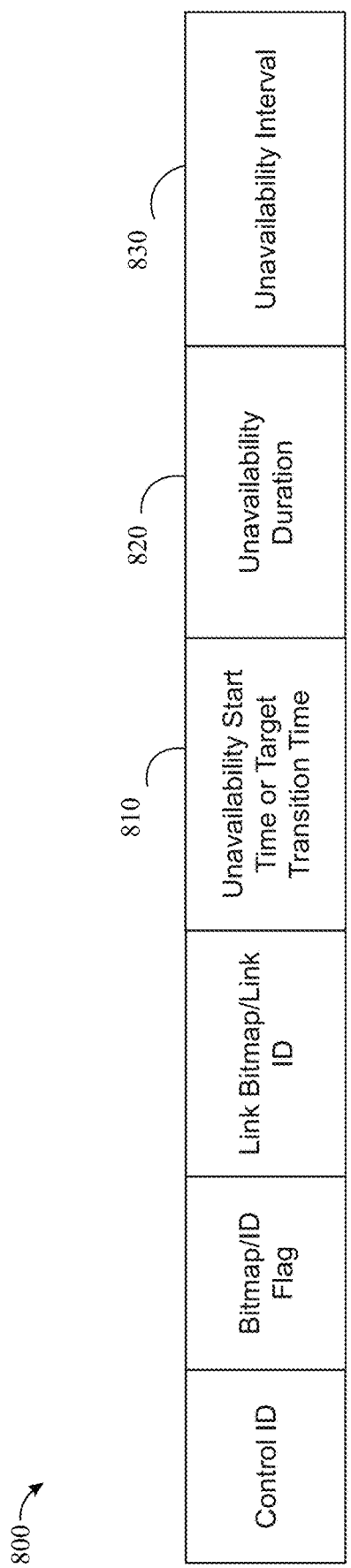
FIG. 8 depicts an example control field used to indicate unavailable links, in accordance with aspects of the present disclosure.

According to a second signaling option, a new control field (with a new format) may be defined, with fields/ subfields, for signaling indications of communication links and corresponding time periods in which a station will operate thereon. For example, the control field may be a variant of a high throughput (HT) control field, such as a high efficiency (HE) variant HT control field that includes an A-control subfield, such as Command and status (CAS), or another subfield variant of an A-Control subfield, such as an adaptive auto rate (AAR) Control subfield, or a newly defined A-control subfield. As illustrated in FIG. 8, a control field 800 may be defined, in which the non-AP STA can indicate the non-AP STA's unavailability on the indicated links in the Link ID bitmap field during the time indicated by a start time (indicated in Unavailability Start time or target transition time field 810), unavailability period (indicated in an unavailability duration field 820), and unavailability interval field 830. As illustrated, the control field 800 may include a Bitmap/ID Flag that, if set to a value of 0, may indicate the subsequent field is a Link Bitmap (e.g., 16 bits), while a 1 may indicate the subsequent field is a Link ID (e.g., 8 bits). The Link ID may include an identifier of the link for which the signaling is being provided. In some cases, the Link ID may be set to a certain value (e.g., a conventionally reserved value 15) to indicate that the signaling applies to all setup links. In some cases, the Target Transition Time field 810 may only be present if the Bitmap/ID Flag is 1.

The Unavailability Start Time/Target Transition Time field 810, Unavailability Duration field 820, and Unavailability Interval field 830 may indicate the time at which the unavailability will start, duration of the unavailability, and periodicity of unavailability. In some cases, the Unavailability Interval field 830 may be set to 0 to indicate an aperiodic case.

The Unavailability Start Time/Target Transition Time field 810 may indicate the time at which the transition will occur. This may be indicated as a relative time (e.g., starting from the end of the frame containing the control field 800) or as an absolute time (e.g., as a value that the TSF timer of the reported link will have at the time of transition.

A third signaling option may add start time, unavailability period, and unavailability fields to an enhanced multi-link (EML) Operating Mode Notification frame. For example, this information may be added as a new field/element or may be included in an EML control field.

Aspects of the present disclosure may involve off-channel TWT mechanisms, that may be enhanced for the signaling purposes proposed herein. For example, one potential enhancement is to allow the AP to steer a client to restricted TWT (r-TWT) schedules of a friendly AP on the same, or another, channel. During an r-TWT, devices refrain (e.g., are restricted from) transmitting. Thus, the client may benefit from the enhanced channel access provided by r-TWT.

In some aspects, an Off-channel TWT response may indicate a Basic Service Set (BSS) Identifier (BSSID) of the friendly AP that can schedule a parallel r-TWT service period (SP) for p2p. In addition, the friendly AP may serve the assisted client using a triggered Transmit opportunity (TXOP) sharing mechanism for P2P. In some cases, the friendly AP may coordinate the association ID (AID) of the clients to ensure that there is no overlap and hence can share the AID of assisted client over a backhaul.

In some aspects, when a non-AP STA returns to a BSS operating channel after an off-channel TWT, the non-AP STA may not be able to receive frames directly from the AP due to channel switch time where the AP assumes the client is in the awake state. Aspects of the present disclosure provide various options to address this scenario.

For example, according to a first option, a non-AP may advertise (e.g., in the non-AP's capabilities) the transition delay between off-channel and on-channel. Based on the advertised transition delay, the AP may wait for the transition delay before sending any frame to the client. In some cases, the non-AP may signal the transition delay between the off-channel and on-channel in the Off-channel TWT request frame so that the AP allocates sufficient time in the Off-channel TWT response frame that covers both data transmissions and channel switch requirements.

According to a second option, the non-AP may request an off-channel TWT SP that is sufficient for both data transmissions and channel switch requirements. In such cases, the non-AP may return back early to on-channel and transmit a notification frame to inform the non-AP's associated AP that the non-AP is available before the end time of the off-channel TWT SP.

According to a third option, an AP may be aware of both off-channel and on-channel TWT (fully scheduled mode) timing. In such cases, between off-channel and on-channel TWT, an AP assumes client in power save mode (PM=1). When negotiating the SPs for on-channel TWT and off-channel TWT, the client may already consider the channel switch delays needed.

Example Operations of a First Station

Figure 9:
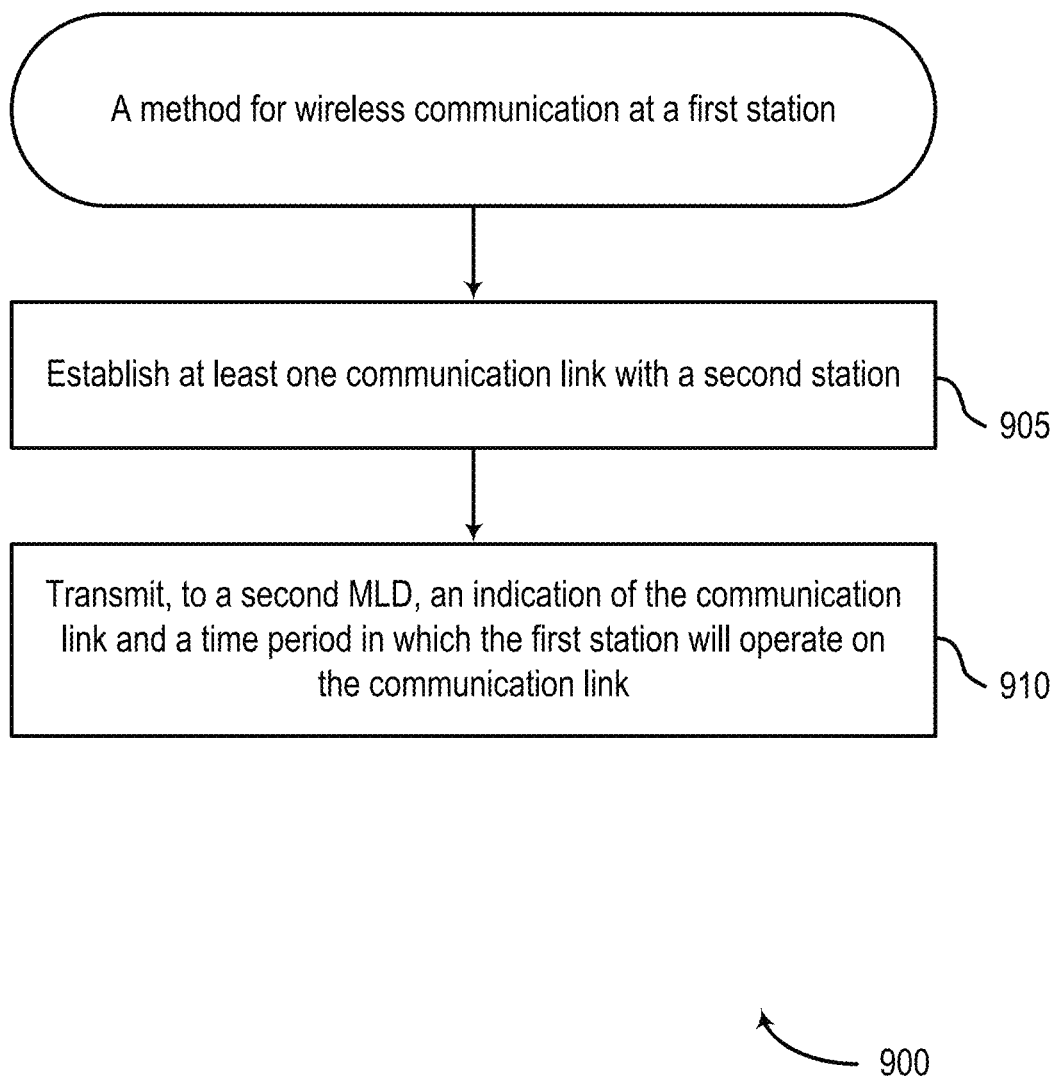
FIG. 9 depicts a method for wireless communications.

FIG. 9 shows an example of a method 900 for wireless communication at a first station. In some cases, the first station may be affiliated with a second MLD. In some examples, the first station is a STA 120 of FIGS. 1 and 2.

Method 900 begins at step 905 with establishing at least one communication link with a second station. In some cases, the operations of this step refer to, or may be performed by, circuitry for establishing and/or code for establishing as described with reference to FIG. 11.

Method 900 then proceeds to step 910 with transmitting, to a first MLD, an indication of the communication link and a time period in which the first station will operate on the communication link. In some cases, the operations of this step refer to, or may be performed by, circuitry for transmitting and/or code for transmitting as described with reference to FIG. 11.

In some aspects, the first station may be affiliated with a second MLD.

In some aspects, the second MLD comprises a non AP MLD; and the first MLD comprises an AP MLD.

In some aspects, the second station is affiliated with a third MLD.

In some aspects, establishing the at least one communication link comprises using at least one of a TDLS procedure, a NAN procedure, or a Wi-Fi direct procedure.

In some aspects, the at least one communication link, which forms a NSTR link pair with another channel on which the first station has established another link with the first MLD, is used for the communication link based at least in part on information received from the first MLD.

In some aspects, the method 900 further includes enabling the at least one communication link during the time period. In some cases, the operations of this step refer to, or may be performed by, circuitry for enabling and/or code for enabling as described with reference to FIG. 11.

In some aspects, the time period comprises a TWT SP negotiated between the first station and the first MILD.

In some aspects, the second MLD comprises an AP.

In some aspects, the at least one communication link comprises at least one P2P link.

In some aspects, the method 900 further includes transmitting, to the first MLD, a request for information to select an off-channel for the at least one P2P link. In some cases, the operations of this step refer to, or may be performed by, circuitry for transmitting and/or code for transmitting as described with reference to FIG. 11.

In some aspects, the method 900 further includes receiving the information, wherein a channel, which does not form a NSTR link pair with another channel on which the first station has established another link with the first MLD, is used for the P2P link based at least in part on the information. In some cases, the operations of this step refer to, or may be performed by, circuitry for receiving and/or code for receiving as described with reference to FIG. 11.

In some aspects, the information includes an ID of an AP configured to schedule a restricted TWT for a P2P link; and using the ID to coordinate with the AP to allow the first station to communicating on the P2P link during the restricted TWT.

In some aspects, the information indicates a channel for an off-channel TWT SP.

In some aspects, the method 900 further includes advertising, as a capability of the first station, a transition delay for the first station to switch between off-channel communications during the off-channel TWT SP and on-channel communications. In some cases, the operations of this step refer to, or may be performed by, circuitry for advertising and/or code for advertising as described with reference to FIG. 11.

In some aspects, the request comprises a request for an off-channel TWT SP that accounts for the transition delay.

In some aspects, the method 900 further includes switching to off-channel communications during the off-channel TWT SP. In some cases, the operations of this step refer to, or may be performed by, circuitry for switching and/or code for switching as described with reference to FIG. 11.

In some aspects, the method 900 further includes transmitting a notification to the first MLD if the first station is available before an end of the TWT SP. In some cases, the operations of this step refer to, or may be performed by, circuitry for transmitting and/or code for transmitting as described with reference to FIG. 11.

In some aspects, transmitting the indication to the first MLD comprises transmitting the indication to the first MLD in a request frame.

In some aspects, transmitting the indication to the first MLD in a request frame comprises transmitting the indication to the first MLD in one of an off-channel TWT request frame or a channel usage request frame.

In some aspects, the TWT request frame indicates the at least one communication link via a link ID field or a link ID bitmap field that indicates which links will be unavailable during an off-channel TWT indicated via the TWT request frame.

In some aspects, the request frame comprises a field indicating that the first station is to: enable or disable an eMLSR link associated with an eMLSR mode; enable or disable an eMLMR link associated with an eMLMR mode; or disable the at least one communication link, wherein the at least one communication link forms a NSTR link pair with another channel on which the first station has established another link with the first MLD.

In some aspects, transmitting the indication to the first MLD comprises transmitting the indication to the first MLD via a control subfield of a control field in a MAC frame header; and the control field includes: a link ID bitmap field indicating the at least one communication link; and at least one of a start time field, an unavailability duration field, an unavailability interval field, or a combination thereof, indicating the time period in which the first station will operate on the at least one communication link.

In some aspects, transmitting the indication to the first MLD comprises transmitting the indication to the first MLD via an EML operating mode notification frame; and the EML operating mode notification frame includes at least one of a start time field, an unavailability period field, an unavailability interval field, or a combination thereof indicating the time period in which the first station will operate on the communication link.

Figure 11:
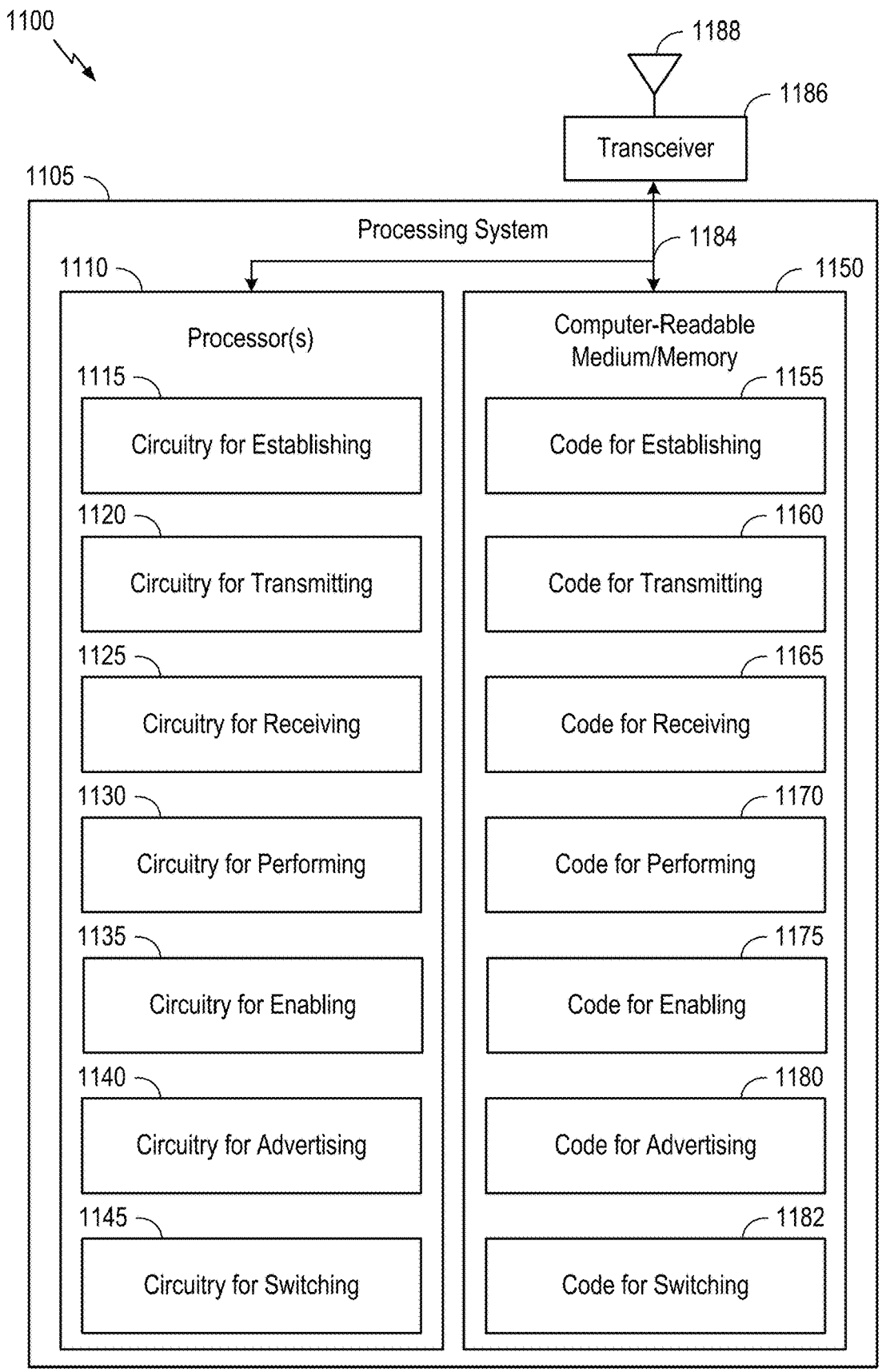
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Second Multi-Link Device

Figure 10:
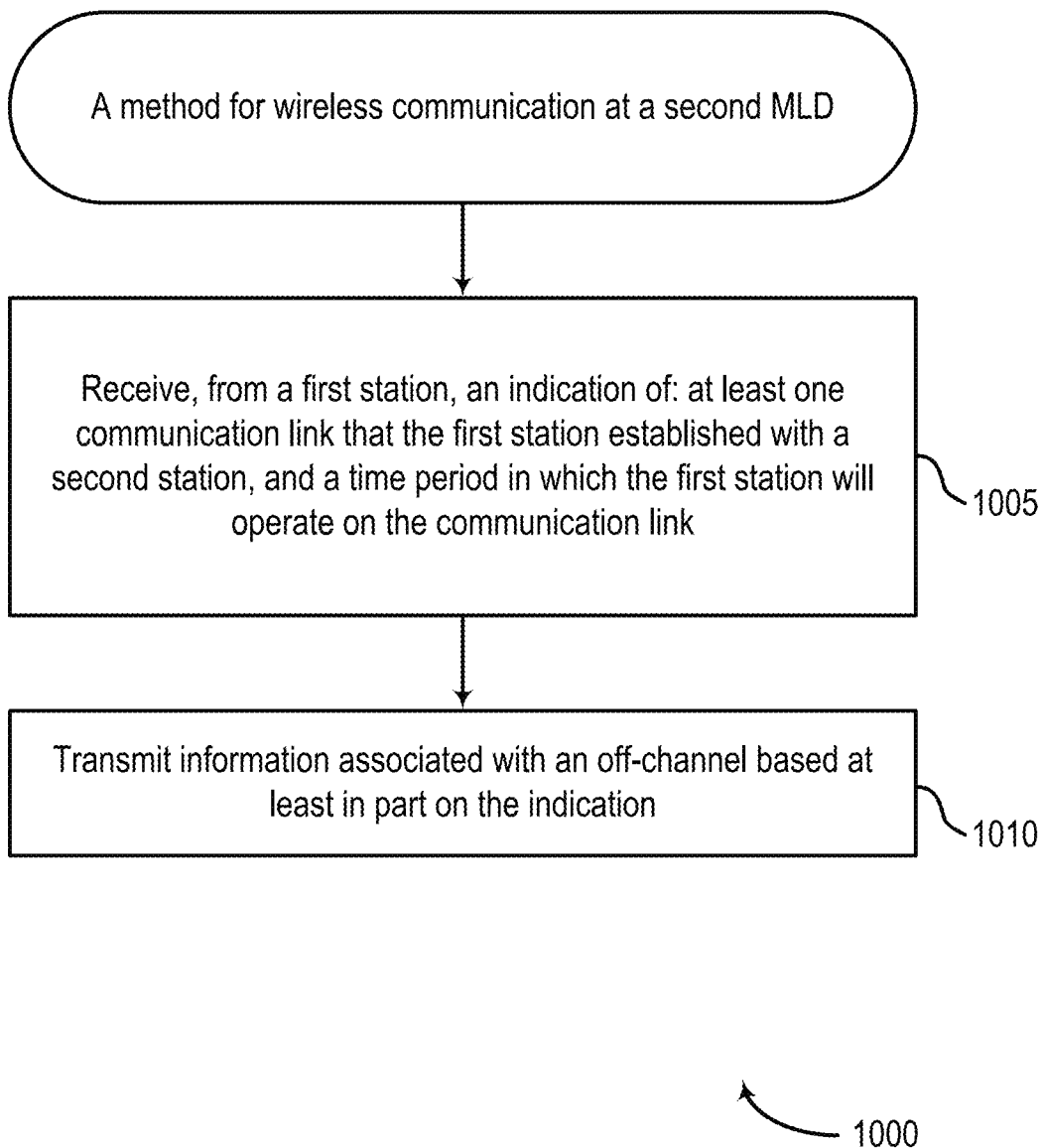
FIG. 10 depicts a method for wireless communications.

FIG. 10 shows an example of a method 1000 for wireless communication at a first MLD. In some examples, the first MLD is an AP 110 of FIGS. 1 and 2.

Method 1000 begins at step 1005 with receiving, from a first station, an indication of: at least one communication link that the first station established with a second station, and a time period in which the first station will operate on the communication link. In some cases, the operations of this step refer to, or may be performed by, circuitry for receiving and/or code for receiving as described with reference to FIG. 11.

Method 1000 then proceeds to step 1010 with transmitting information, based on the indication, to assist the first station in selecting an off-channel for communications. In some cases, the operations of this step refer to, or may be performed by, circuitry for performing and/or code for performing as described with reference to FIG. 11.

In some aspects, the first station may be affiliated with a second MLD.

In some aspects, the second MLD comprises a non AP MLD; and the first MLD comprises an AP MLD.

In some aspects, the second station is affiliated with a third MLD.

In some aspects, the at least one communication link, which forms a NSTR link pair with another channel on which the first station has established another link with the first MLD, is used for the communication link based at least in part on information (e.g., assistance information) transmitted to the first station.

In some aspects, the second MLD comprises an AP.

In some aspects, the at least one communication link comprises at least one P2P link.

In some aspects, the method 1000 further includes receiving, from the first station, a request for information (e.g., assistance information) to select an off-channel for the at least one P2P link. In some cases, the operations of this step refer to, or may be performed by, circuitry for receiving and/or code for receiving as described with reference to FIG. 11.

In some aspects, the method 1000 further includes transmitting the information. In some cases, the operations of this step refer to, or may be performed by, circuitry for transmitting and/or code for transmitting as described with reference to FIG. 11.

In some aspects, the information includes an ID of an AP configured to schedule a restricted TWT for a P2P link; and using the ID to coordinate with the AP to allow the first station to communicating on the P2P link during the restricted TWT.

In some aspects, the information indicates a channel for an off-channel TWT SP.

In some aspects, the method 1000 further includes receiving capability information indicating a transition delay for the first station to switch between off-channel communications during the off-channel TWT SP and on-channel communications. In some cases, the operations of this step refer to, or may be performed by, circuitry for receiving and/or code for receiving as described with reference to FIG. 11.

In some aspects, the request comprises a request for an off-channel TWT SP that accounts for the transition delay.

In some aspects, the method 1000 further includes receiving a notification from the first station if the first station is available before an end of the TWT SP after switching to off-channel communications during the off-channel TWT SP. In some cases, the operations of this step refer to, or may be performed by, circuitry for receiving and/or code for receiving as described with reference to FIG. 11.

In some aspects, receiving the indication from the first MLD comprises receiving the indication from the first station in a request frame.

In some aspects, receiving the indication from the first station in a request frame comprises receiving the indication from the first station in one of an off-channel TWT request frame or a channel usage request frame.

In some aspects, the TWT request frame indicates the at least one communication link via a link ID field or a link ID bitmap field that indicates which links will be unavailable during an off-channel TWT indicated via the TWT request frame.

In some aspects, the request frame comprises a field indicating that the first station is to: enable or disable an eMLSR link associated with an eMLSR mode; enable or disable an eMLMR link associated with an eMLMR mode; or disable the at least one communication link, wherein the at least one communication link forms a NSTR link pair with another channel on which the first station has established another link with the first MLD.

In some aspects, receiving the indication from the first station comprises receiving the indication from the first station via a control subfield of a control field in a MAC frame header; and the control field includes: a link ID bitmap field indicating the at least one communication link; and at least one of a start time field, an unavailability duration field, an unavailability interval field, or a combination thereof, indicating the time period in which the first station will operate on the at least one communication link.

In some aspects, receiving the indication from the first station comprises receiving the indication from the first station via an EML operating mode notification frame; and the EML operating mode notification frame includes at least one of a start time field, an unavailability period field, an unavailability interval field, or a combination thereof indicating the time period in which the first station will operate on the communication link.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communication Device

FIG. 11 depicts aspects of an example communications device 1100. In some aspects, communications device 1100 is a station, such as a STA 120 described above with respect to FIGS. 1 and 2. In some aspects, communications device 1100 is an AP, such as an AP 110 described above with respect to FIGS. 1 and 2.

The communications device 1100 includes a processing system 1105 coupled to the transceiver 1186 (e.g., a transmitter and/or a receiver). The transceiver 1186 is configured to transmit and receive signals for the communications device 1100 via the antenna 1188, such as the various signals as described herein. The transceiver 1186 may be an example of aspects of transceiver 222 and/or transceiver 254 described with reference to FIG. 2. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of the RX data processor 270, the TX data processor 288, the TX spatial processor 290, or the controller 280 of STA 120 illustrated in FIG. 2. In various aspects, the one or more processors 1110 may be representative of one or more of the RX data processor 242, the TX data processor 210, the TX spatial processor 220, or the controller 230 of AP 110 illustrated in FIG. 2. The one or more processors 1110 are coupled to a computer-readable medium/memory 1150 via a bus 1184. In certain aspects, the computer-readable medium/memory 1150 is configured to store instructions (e.g., computer-executable code) that when executed by the one or more processors 1110, cause the one or more processors 1110 to perform the method 900 described with respect to FIG. 9, or any aspect related to it, and/or the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1150 stores code (e.g., executable instructions), such as code for establishing 1155, code for transmitting 1160, code for receiving 1165, code for performing 1170, code for enabling 1175, code for advertising 1180, and code for switching 1182. Processing of the code for establishing 1155, code for transmitting 1160, code for receiving 1165, code for performing 1170, code for enabling 1175, code for advertising 1180, and code for switching 1182 may cause the communications device 1100 to perform the method 900 described with respect to FIG. 9, or any aspect related to it, and/or the method 1000 described with respect to FIG. 10, or any aspect related to it.

The one or more processors 1110 include circuitry configured to implement (e.g., execute) the code stored in the computer-readable medium/memory 1150, including circuitry such as circuitry for establishing 1115, circuitry for transmitting 1120, circuitry for receiving 1125, circuitry for performing 1130, circuitry for enabling 1135, circuitry for advertising 1140, and circuitry for switching 1145. Processing with circuitry for establishing 1115, circuitry for transmitting 1120, circuitry for receiving 1125, circuitry for performing 1130, circuitry for enabling 1135, circuitry for advertising 1140, and circuitry for switching 1145 may cause the communications device 1100 to perform the method 900 described with respect to FIG. 9, or any aspect related to it, and/or the method 1000 described with respect to FIG. 10, or any aspect related to it.

Various components of the communications device 1100 may provide means for performing the method 900 described with respect to FIG. 9, or any aspect related to it, and/or the method 1000 described with respect to FIG. 10, or any aspect related to it. For example, in some cases, means for transmitting, sending or outputting for transmission may include the transmitter unit 254 or antenna(s) 252 of the STA 120 illustrated in FIG. 2 and/or the transceiver 1186 and the antenna 1188 of the communications device 1100 in FIG. 11. In some cases, means for transmitting, sending or outputting for transmission may include the transmitter unit 222 or an antenna(s) 224 of AP 110 illustrated in FIG. 2 and/or the transceiver 1186 and the antenna 1188 of the communications device 1100 in FIG. 11. In some aspects, means for receiving or obtaining may include the receiver unit 254 or antenna(s) 252 of STA 120 illustrated in FIG. 2 and/or the transceiver 1186 and the antenna 1188 of the communications device 1100 in FIG. 11. In some aspects, means for receiving or obtaining may include the receiver unit 222 or an antenna(s) 224 of AP 110 illustrated in FIG. 2 and/or the transceiver 1186 and the antenna 1188 of the communications device 1100 in FIG. 11.

Example Clauses

Implementation examples are described in the following numbered clauses:

Clause 1: A method for wireless communication at a first station, comprising: establishing at least one communication link with a second station; and transmitting, to a first MLD, an indication of the communication link and a time period in which the first station will operate on the communication link.

Clause 2: The method of Clause 1, wherein: the first station is affiliated with a second MLD.

Clause 3: The method of Clause 2, wherein: the second MLD comprises a non AP MLD; and the first MLD comprises an AP MLD.

Clause 4: The method of any one of Clauses 1-3, wherein the second station is affiliated with a third MLD.

Clause 5: The method of any one of Clauses 1-4, wherein establishing the at least one communication link comprises using at least one of a TDLS procedure, a NAN procedure, or a Wi-Fi direct procedure.

Clause 6: The method of any one of Clauses 1-5, wherein the at least one communication link, which forms a NSTR link pair with another channel on which the first station has established another link with the first MLD, is used for the communication link based at least in part on information received from the first MLD.

Clause 7: The method of any one of Clauses 1-6, further comprising: enabling the at least one communication link during the time period.

Clause 8: The method of Clause 7, wherein the time period comprises a TWT SP negotiated between the first station and the first MLD.

Clause 9: The method of any one of Clauses 1-8, wherein the at least one communication link comprises at least one P2P link.

Clause 10: The method of Clause 9, further comprising: transmitting, to the first MLD, a request for information to select an off-channel for the at least one P2P link; and receiving the information, wherein a channel, which does not form a NSTR link pair with another channel on which the first station has established another link with the first MLD, is used for the P2P link based at least in part on the information Clause 11: The method of Clause 10, wherein the information includes an ID of an AP configured to schedule a restricted TWT for a P2P link; and using the ID to coordinate with the AP to allow the first station to communicating on the P2P link during the restricted TWT.

Clause 12: The method of Clause 10, wherein the information indicates a channel for an off-channel TWT SP.

Clause 13: The method of Clause 12, further comprising: advertising, as a capability of the first station, a transition delay for the first station to switch between off-channel communications during the off-channel TWT SP and on-channel communications.

Clause 14: The method of Clause 13, wherein the request comprises a request for an off-channel TWT SP that accounts for the transition delay.

Clause 15: The method of Clause 14, further comprising: switching to off-channel communications during the off-channel TWT SP; and transmitting a notification to the first MILD if the first station is available before an end of the TWT SP Clause 16: The method of any one of Clauses 1-15, wherein transmitting the indication to the first MILD comprises transmitting the indication to the first MILD in a request frame.

Clause 17: The method of Clause 16, wherein transmitting the indication to the first MLD in a request frame comprises transmitting the indication to the first MLD in one of an off-channel TWT request frame or a channel usage request frame.

Clause 18: The method of Clause 17, wherein the TWT request frame indicates the at least one communication link via a link ID field or a link ID bitmap field that indicates which links will be unavailable during an off-channel TWT indicated via the TWT request frame.

Clause 19: The method of Clause 16, wherein the request frame comprises a field indicating that the first station is to: enable or disable an eMLSR link associated with an eMLSR mode; enable or disable an eMLMR link associated with an eMLMR mode; or disable the at least one communication link, wherein the at least one communication link forms a NSTR link pair with another channel on which the first station has established another link with the first MILD.

Clause 20: The method of any one of Clauses 1-19, wherein: transmitting the indication to the first MLD comprises transmitting the indication to the first MLD via a control subfield of a control field in a MAC frame header; and the control field includes: a link ID bitmap field indicating the at least one communication link; and at least one of a start time field, an unavailability duration field, an unavailability interval field, or a combination thereof, indicating the time period in which the first station will operate on the at least one communication link.

Clause 21: The method of any one of Clauses 1-20, wherein: transmitting the indication to the first MLD comprises transmitting the indication to the first MLD via an EML operating mode notification frame; and the EML operating mode notification frame includes at least one of a start time field, an unavailability period field, an unavailability interval field, or a combination thereof indicating the time period in which the first station will operate on the communication link.

Clause 22: A method for wireless communication at a first MILD, comprising: receiving, from a first station, an indication of: at least one communication link that the first station established with a second station, and a time period in which the first station will operate on the communication link; and transmitting information, based on the indication, to assist the first station in selecting an off-channel for communications.

Clause 23: The method of Clause 22, wherein the first station is affiliated with a second MLD.

Clause 24: The method of Clause 23, wherein: the second MLD comprises a non AP MLD; and the first MLD comprises an AP MLD.

Clause 25: The method of any one of Clauses 22-24, wherein the second station is affiliated with a third MLD.

Clause 26: The method of any one of Clauses 22-25, wherein the at least one communication link, which forms a NSTR link pair with another channel on which the first station has established another link with the first MLD, is used for the communication link based at least in part on information transmitted to the first station.

Clause 27: The method of any one of Clauses 22-26, wherein the at least one communication link comprises at least one P2P link.

Clause 28: The method of Clause 27, wherein the indication is received in a request for information.

Clause 29: The method of Clause 28, wherein the information includes an ID of an AP configured to schedule a restricted TWT for a P2P link; and using the ID to coordinate with the AP to allow the first station to communicating on the P2P link during the restricted TWT.

Clause 30: The method of Clause 28, wherein the information indicates a channel for an off-channel TWT SP.

Clause 31: The method of Clause 30, further comprising: receiving capability information indicating a transition delay for the first station to switch between off-channel communications during the off-channel TWT SP and on-channel communications.

Clause 32: The method of Clause 31, wherein the request comprises a request for an off-channel TWT SP that accounts for the transition delay.

Clause 33: The method of Clause 32, further comprising: receiving a notification from the first station if the first station is available before an end of the TWT SP after switching to off-channel communications during the off-channel TWT SP.

Clause 34: The method of any one of Clauses 22-33, wherein receiving the indication from the first MLD comprises receiving the indication from the first station in a request frame.

Clause 35: The method of Clause 34, wherein receiving the indication from the first station in a request frame comprises receiving the indication from the first station in one of an off-channel TWT request frame or a channel usage request frame.

Clause 36: The method of Clause 35, wherein the TWT request frame indicates the at least one communication link via a link ID field or a link ID bitmap field that indicates which links will be unavailable during an off-channel TWT indicated via the TWT request frame.

Clause 37: The method of Clause 34, wherein the request frame comprises a field indicating that the first station is to: enable or disable an eMLSR link associated with an eMLSR mode; enable or disable an eMLMR link associated with an eMLMR mode; or disable the at least one communication link, wherein the at least one communication link forms a NSTR link pair with another channel on which the first station has established another link with the first MLD.

Clause 38: The method of any one of Clauses 22-37, wherein: receiving the indication from the first station comprises receiving the indication from the first station via a control subfield of a control field in a MAC frame header; and the control field includes: a link ID bitmap field indicating the at least one communication link; and at least one of a start time field, an unavailability duration field, an unavailability interval field, or a combination thereof, indicating the time period in which the first station will operate on the at least one communication link.

Clause 39: The method of any one of Clauses 22-38, wherein: receiving the indication from the first station comprises receiving the indication from the first station via an EML operating mode notification frame; and the EML operating mode notification frame includes at least one of a start time field, an unavailability period field, an unavailability interval field, or a combination thereof indicating the time period in which the first station will operate on the communication link.

Clause 40: An apparatus, comprising: a memory comprising executable instructions; and a processor configured to execute the executable instructions and cause the apparatus to perform a method in accordance with any one of Clauses 1-39.

Clause 41: An apparatus, comprising means for performing a method in accordance with any one of Clauses 1-39.

Clause 42: A non-transitory computer-readable medium comprising executable instructions that, when executed by a processor of an apparatus, cause the apparatus to perform a method in accordance with any one of Clauses 1-39.

Clause 43: A computer program product embodied on a computer-readable storage medium comprising code for performing a method in accordance with any one of Clauses 1-39.

Clause 44: The method of Clause 1, wherein the first station is an AP and the second station is an AP.

Clause 45: The method of Clause 1, further comprising requesting assistance to select one or more of a channel and a target wakeup time (TWT) service period (SP).

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "communicating" broadly encompasses a variety of signaling between devices. Communicating may include one or both of receiving (or obtaining) or transmitting (outputting for transmission).

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first station configured for wireless communications, the first station comprising:
a memory comprising computer-executable instructions; and
one or more processors configured to execute the computer-executable instructions and cause the first station to:
establish at least one peer to peer (P2P) link with a second station;
transmit, to a wireless device, an indication of the at least one P2P link and a time period in which the first station will operate on the at least one P2P link;
transmit, to the wireless device, a request for information to select a channel for the at least one P2P link; and
receive the information.

2. The first station of claim 1, wherein at least one of:
the wireless device is an access point (AP) or a first multi-link device (MLD); or
the first station is affiliated with a second MLD.

3. The first station of claim 1, wherein:
the first station is affiliated with a multi-link device (MLD) that comprises a non access point (AP) MLD; and
the wireless device comprises an AP MLD.

4. The first station of claim 3, wherein the second station is affiliated with a third MLD.

5. The first station of claim 1, wherein the one or more processors are configured to execute the computer-executable instructions and cause the first station to establish the at least one P2P link using at least one of a tunneled direct link setup (TDLS) procedure, a neighbor aware network (NAN) procedure, or a Wi-Fi direct procedure.

6. The first station of claim 1, wherein the at least one P2P link, which forms a non-simultaneous transmit receive (NSTR) link pair with another channel on which the first station has established another link with the wireless device, is used for the at least one P2P link based at least in part on information received from the wireless device.

7. The first station of claim 1, wherein the one or more processors are further configured to cause the first station to enable the at least one P2P link during the time period.

8. The first station of claim 1, wherein the time period comprises a Target Wake Time (TWT) service period (SP) negotiated between the first station and the wireless device.

9. The first station of claim 1, wherein:
the information includes an identifier (ID) of an access point (AP) configured to schedule a restricted target wakeup time (TWT) for the at least one P2P link; and
the one or more processors are further configured to cause the first station to communicate on the at least one P2P link during the restricted TWT based at least in part on the information.

10. The first station of claim 1, wherein the information indicates a channel for a target wakeup time (TWT) service period (SP).

11. The first station of claim 10, wherein the one or more processors are further configured to cause the first station to advertise, as a capability of the first station, a transition delay for the first station to switch between off-channel communications during the TWT SP and on-channel communications.

12. The first station of claim 11, wherein the request comprises a request for a TWT SP that accounts for the transition delay.

13. The first station of claim 10, wherein the one or more processors are further configured to cause the first station to:
switch to communications during the TWT SP; and
transmit a notification to the wireless device if the first station is available before an end of the TWT SP.

14. The first station of claim 1, wherein the one or more processors are configured to execute the computer-executable instructions and cause the first station to transmit the indication to the wireless device in a frame.

15. The first station of claim 14, wherein the frame is a target wakeup time (TWT) request frame or a channel usage request frame.

16. The first station of claim 14, wherein the frame indicates the at least one P2P link will be unavailable during a TWT indicated via the frame.

17. The first station of claim 14, wherein the frame comprises a field indicating that the first station is to:
enable or disable an enhanced multi link single radio (eMLSR) link associated with an eMLSR mode;
enable or disable an enhanced multi link multiple radio (eMLMR) link associated with an eMLMR mode; or disable the at least one P2P link, wherein the at least one P2P link forms a non-simultaneous transmit receive (NSTR) link pair with another channel on which the first station has established another link with the wireless device.

18. The first station of claim 1, wherein:
the one or more processors are configured to execute the computer-executable instructions and cause the first station to transmit the indication to the wireless device via a control subfield of a control field in a medium access control (MAC) frame header; and
the control field includes:
   a link identifier (ID) bitmap field indicating the at least one P2P link; and
   at least one of a start time field, an unavailability duration field, an unavailability interval field, or a combination thereof, indicating the time period in which the first station will operate on the at least one P2P link.

19. The first station of claim 1, wherein:
the one or more processors are configured to execute the computer-executable instructions and cause the first station to the wireless device via an enhanced multi-link (EML) operating mode notification frame; and
the EML operating mode notification frame includes at least one of a start time field, an unavailability period field, an unavailability interval field, or a combination thereof indicating the time period in which the first station will operate on the P2P link.

20. A wireless device configured for wireless communications, the wireless device comprising:
a memory comprising computer-executable instructions; and
one or more processors configured to execute the computer-executable instructions and cause the wireless device to:
   receive, from a first station, an indication of: at least one communication peer to peer (P2P) link that the first station established with a second station, and a time period in which the first station will operate on the at least one P2P link;
   receive, from the first station, a request for information to select a channel for the at least one P2P link; and
   transmit the information.

21. The wireless device of claim 20, wherein at least one of:
   the wireless device is an access point (AP) or a first multi link device (MLD); or
   the first station is affiliated with a second MLD.

22. The wireless device of claim 21, wherein the first station is affiliated with a non-AP; and
the wireless device comprises an AP MLD.

23. The wireless device of claim 20, wherein the second station is affiliated with a third MLD.

24. The wireless device of claim 20, wherein the at least one P2P link, which forms a non-simultaneous transmit receive (NSTR) link pair with another channel on which the first station has established another link with the wireless device, is used for the P2P link based at least in part on information transmitted to the first station.

25. The wireless device of claim 20, wherein the one or more processors are configured to execute the computer-executable instructions and cause the first station to receive the indication from the first station in a frame.

26. A method for wireless communication at a first station, the method comprising:
   establishing at least one communication peer to peer (P2P) link with a second station;
   transmitting, to a wireless device, an indication of the at least one P2P link and a time period in which the first station will operate on the at least one P2P link;
   transmitting, to the wireless device, a request for information to select a channel for the at least one P2P link; and
   receiving the information.

27. A method for wireless communication at a wireless device, the method comprising:
   receiving, from a first station, an indication of: at least one peer to peer (P2P) link that the first station established with a second station, and a time period in which the first station will operate on the at least one P2P link;
   receiving, from the first station, a request for information to select a channel for the at least one P2P link; and
   transmitting the information.

28. The first station of claim 1, wherein a channel, which does not form a non-simultaneous transmit receive (NSTR) link pair with another channel on which the first station has established another link with the wireless device, is selected for the at least one P2P link based at least in part on the information.

* * * * *